Feb. 10, 1942.   H. W. GREENUP   2,272,880
PRODUCTION OF RUBBER ARTICLES
Filed May 12, 1938   2 Sheets-Sheet 1

INVENTOR
HAROLD W. GREENUP
BY
ATTORNEYS

Feb. 10, 1942.   H. W. GREENUP   2,272,880
PRODUCTION OF RUBBER ARTICLES
Filed May 12, 1938   2 Sheets-Sheet 2
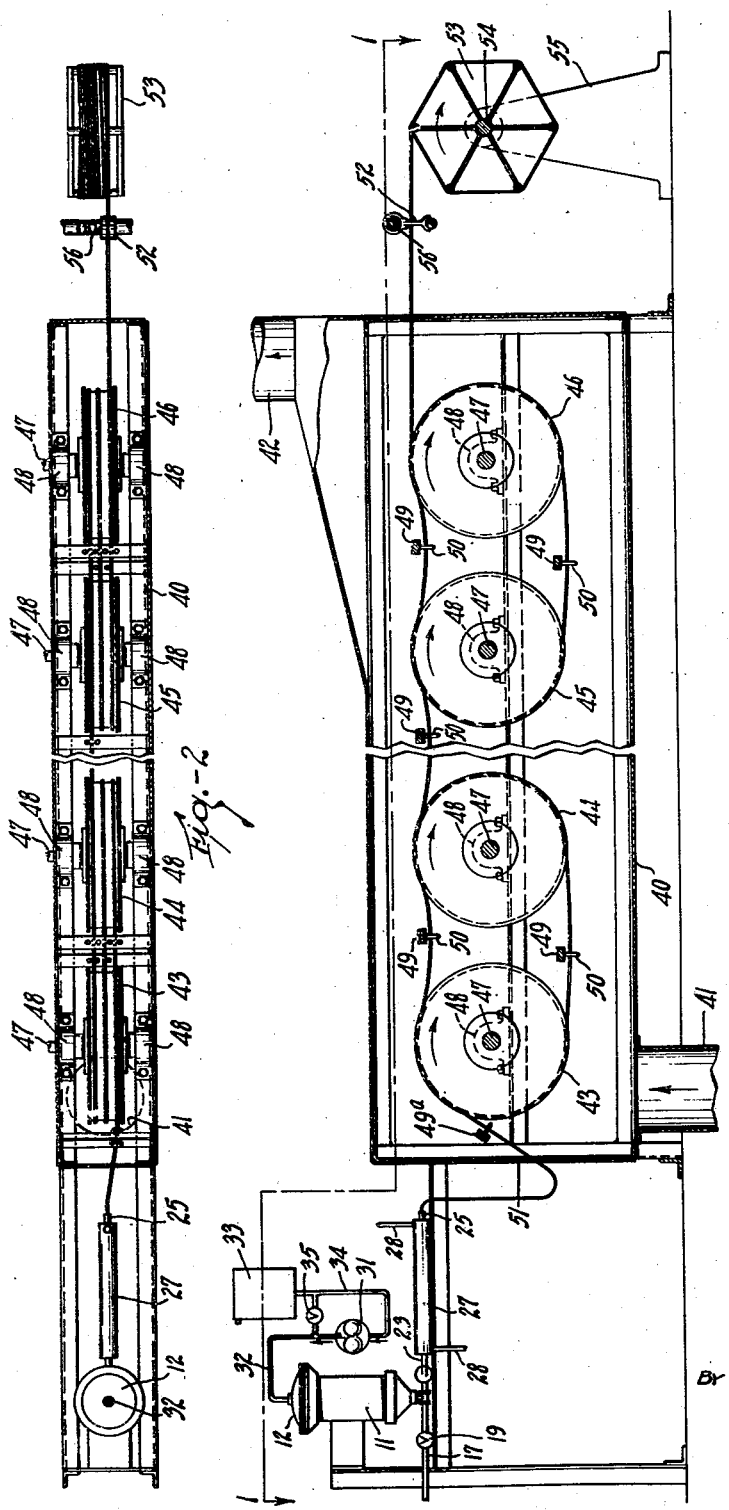
INVENTOR
HAROLD W. GREENUP
By Ely & Frye
ATTORNEYS Patented Feb. 10, 1942

2,272,880

UNITED STATES PATENT OFFICE 2,272,880

PRODUCTION OF RUBBER ARTICLES

Harold W. Greenup, Akron, Ohio, assignor to The Firestone Tire & Rubber Company, Akron, Ohio, a corporation of Ohio Application May 12, 1938, Serial No. 207,533

3 Claims. (Cl. 18—8)

This invention relates to the production of rubber articles, particularly to the production of thread, tubing, strip, or the like, from liquid latex, without the use of an acid coagulating bath.

Heretofore various apparatus and methods have been used to form threads and similar articles directly from liquid latex, but such apparatus has been unsatisfactory or inefficient for one or more reasons. Thus certain types of apparatus produce thread very slowly while other types produce it at an uneven rate of speed resulting in a non-uniform thread and making the handling of such thread difficult. Other types which do not confine the latex to a definite shape during coagulation yield a non-uniform thread. Still other types of apparatus force a gas into a latex chamber at a uniform rate in an effort to secure uniform extrusion, but non-uniform production and product still result due to the compressibility of the gas.

The chief object of this invention is to overcome the foregoing and other disadvantages of known types of apparatus and to provide apparatus and methods for continuously molding a long, uniform rubber article directly from liquid latex at a uniform rate.

Another object of the invention is to produce latex thread at a rapid rate of speed.

The foregoing and other objects are achieved by leading heat-sensitized latex into a pressure chamber which has an elastic diaphragm therein separating the chamber into two portions. Liquid latex is in the portion of the chamber adjacent to and connected with the forming mold and an incompressible fluid is in the portion of the chamber on the other side of the diaphragm. Means are associated with the chamber to force more incompressible liquid therein at a constant rate to distort the elastic diaphragm and exert pressure upon the latex to force it from the chamber at the same rate that the liquid is pumped into the chamber. Incompressible liquids completely fill the system to prevent such absorption of pressure as would result if compressible substances were present. Thus by controlling the forced feed into the chamber, a direct control is provided for the rate of continuous molding of latex and forcing of molded rubber through the forming mold. The latter comprises a heated capillary tube when a thread is to be formed in the mold.

In the accompanying drawings:

Figure 2 is a plan view of the apparatus of Figure 3; and

Figure 3 is a sectional elevation, partly diagrammatic, of apparatus for producing and treating thread in accordance with the invention.

Figure 1:
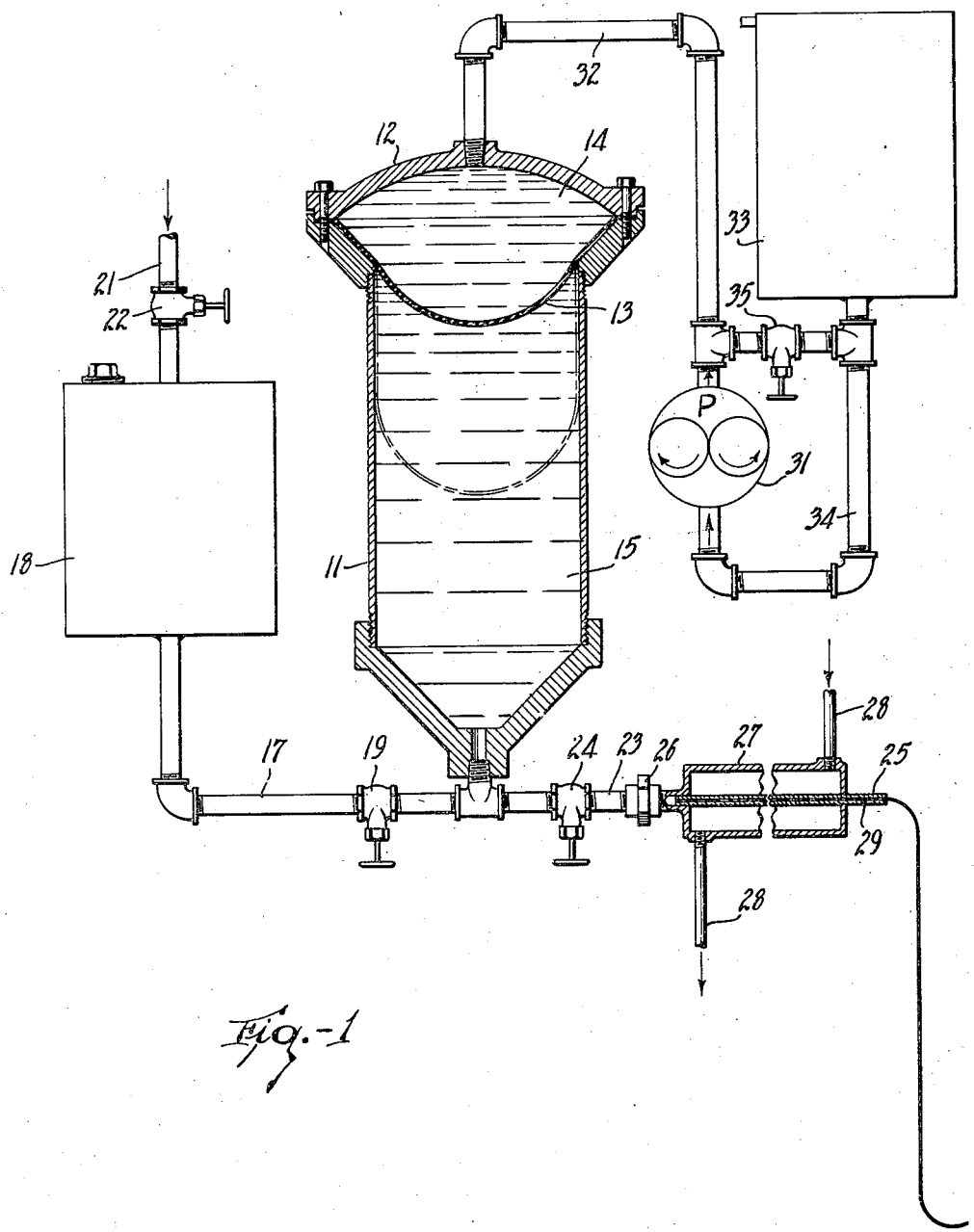
Figure 1 is an elevation, partly in section, of one embodiment of apparatus before practicing the invention.

The thread-making process of the present invention is an improvement upon the process disclosed in Pestalozza Reissue Patent No. 18,437, and heat sensitized latex is employed.

Figure 1 of the drawings shows an air-tight chamber 11 that has a head 12 removably secured thereto. An elastic diaphragm 13 which is made from any suitable material, such as rubber, is secured in the container 11 by the head 12 so that it divides the container into two portions 14 and 15, which are adjacent the entrance to, and exit from the chamber, respectively. The chamber 11 is constructed so that it can withstand high pressure. Latex is supplied to the lower portion of the chamber through the pipe 17 which extends to a latex storage container 18 with a valve 19 being connected in pipe 17 to control the flow of latex to the chamber. Normally, pressure is required to force latex into chamber 11, and a pipe 21 having a valve 22 therein is connected to the upper portion of the tank 18 and extends to a source of compressed air (not shown) so that pressure can be applied to latex in the container. Thus latex can be forced into the lower portion of the chamber and it should completely fill section 15 thereof as shown (Fig. 1).

An outlet pipe 23 receives the liquid latex forced from the chamber 11 and a valve 24 is provided therein to prevent flow therethrough when latex is being pumped into the chamber, if desired. A forming mold, which in this embodiment of the invention comprises a capillary tube 25, is secured to the pipe 23 by a suitable coupling 26 to receive latex forced from the chamber. A jacket 27 is positioned around the tube 25 and is supplied with steam, or other heating fluid, through tubes 28 which connect to a source thereof (not shown). Thus any heat-sensitized latex in the tube is coagulated due to the heat supplied thereto, and it necessarily is of the form of the bore 29 of the forming mold, tube 25. The rubber coagulum, in this instance in the form of thread, is forced from the tube by liquid latex being forced from chamber 11. Sometimes it is desirable to cool the latex adjacent the coupling 26 to prevent premature coagulation thereof and suitable cooling means may be provided for that purpose. Other heating means such as a high frequency electrical current may be used, if desired, to coagulate latex in the mold. Of course, the forming mold will be changed when it is desired to coagulate the latex in a different thread size or in other than thread form.

Means are provided to force incompressible liquid into the chamber 11 at a uniform rate of flow whereby sufficient pressure is exerted upon any latex therein to force it therefrom at the same rate of flow as the input of liquid into the chamber. These means may include a constant output feed pump 31 which connects to the upper section of the chamber by pipe 32 and which has a constant output regardless of the pressure required to produce such output. The input side of pump 31 is connected to a tank 33 by tube 34. The tank 33 may contain any suitable, substantially incompressible liquid, such as glycerine. Thus, in operation, the pump 31 receives liquid from tank 33 and forces it into chamber 11 at a constant rate of flow. As shown in Figure 1 of the drawings, the chamber is completely filled with liquid, this construction preferably being secured in any suitable manner when assembling the apparatus. Then operation of pump 31 forces liquid into chamber 11 at a constant rate of flow; this, in turn, forces latex from section 15 of the chamber into and trough the tube 25 at the same uniform rate of flow. Even though the resistance of the latex to passage on through the tube 25 varies considerably, the pump will correspondingly vary the pressure applied to the latex in the chamber, whereby a uniform flow of latex into, and rubber coagulum from, the forming mold still results. This is an important feature of the invention and differs it from all structures now known to me. It is essential that no air or other pressure absorbing medium be present in the system so that the liquid fed into the chamber by pump 31 forces exactly the same amount of liquid therefrom.

After the elastic diaphragm 13 has been distorted downwardly, as indicated in dotted lines in Figure 1, until it has substantially emptied all latex from the chamber, the chamber is refilled with latex. This is done by closing valve 24, opening valve 19 and applying pressure to the upper surface of the latex in container 18. At the same time, pump 31 is shut off and bypass valve 35 that is connected between pipes 32 and 34 is opened. This permits glycerine expelled from the chamber by the latex pumped therein to flow back to tank 33 through pipe 32 and valve 35. After refilling chamber 11, valves 19, 22 and 35 are closed, valve 24 opened and the pump 31 started so that latex again is forced through the forming mold at the desired rate.

Figure 3 shows one type of apparatus which may be used to treat the thread produced in accordance with the invention, and such apparatus includes a drying oven 40 which is supplied with hot air through flue 41. The moisture in the thread is thus withdrawn by the hot gases and exhausted from the oven through exhaust flue 42. A plurality of pulleys or sheaves 43 44, 45 and 46 are carried by shafts 47 which are journalled in housings 48 in the oven 40. The shafts 47 extend from the oven and should connect to common driving means (not shown) so that the pulleys are driven uniformly. A plurality of bars 49 having a plurality of fingers 50 extending therefrom are secured between the opposite sides of the chamber to separate and guide the convolutions of the thread.

The rubber thread formed in the tube 25 is led into the oven 40 through an opening 51 therein and guided by bar 49a to one side of the periphery of pulley 43. Preferably the thread is given a tortuous path through the oven 40, as indicated in Figures 2 and 3. Thus it is looped around the pair of pulleys 43 and 44 and then looped around pulleys 45 and 46 before being led from the oven. Bars 49 and fingers 50 combine to maintain the thread in the desired areas of the pulleys, as shown, to prevent contact of the loops of thread. The instant construction suspends the thread in the hot gases of the chamber so as to dry it thoroughly while in the chamber. Since the pulleys preferably are driven, no stress is exerted upon the thread while passing through the drying oven, for the surface speeds of the pulleys are adjusted to equal the rate at which the thread is formed in tube 25. Sometimes it is desirable to place slight tension upon the rubber coagulum in tube 25 to facilitate its withdrawal therefrom and this may be exerted by pulleys 43 and 44, if desired. Obviously the oven 40 may be of any desired length and be provided with any suitable number of pulleys.

The dried thread from oven 40 passes through a guide 52 and thence to a form 53 that is carried by a shaft 54. The shaft 54 is journalled in a base 55 and driven by suitable means at the same surface speed as the pulleys whereby thread is coiled upon the drum as it comes from the oven. The guide may be carried by a suitable level-wind mechanism 56 to distribute the thread over form 53.

Pressures from 400 to 1000 pounds per square inch have been placed upon latex in chamber 11 in the practice of the invention and have produced from 100 to 150 feet per minute of threads from .010 to .050 inch in diameter. These threads have been of uniform cross-section and were produced at a regular rate of speed. The thread not only is produced quite rapidly but also is of high quality.

The word latex is used in the specification and claims to include within its meaning all dispersions of rubber, either natural or artificial and including both vulcanized and non-vulcanized rubber.

It will be observed that the instant invention differs fundamentally from extrusion processes of forming latex articles, these usually comprising extruding liquid latex in an acid coagulant whereas I coagulate the latex when it is passing through a forming mold. As no acid coagulating bath is employed in the practice of the present invention, there is no acid residue on, or in, the finished thread.

In accordance with the patent statutes, I have shown and described one embodiment of my invention. However, it will be understood that various modifications thereof may be made without departing from the scope of the invention as defined by the appended claims.

What is claimed is:

1. In the method of forming a rubber thread, the steps comprising placing latex in a chamber, forcing a substantially incompressible liquid into the chamber at a constant rate, which liquid is maintained separate from the latex, expelling the latex from the chamber at a uniform rate of flow, confining the expelled latex to thread form by tubular means, gelling the latex while confined to form rubber thread, and forcing the rubber thread from the tubular means at a constant rate by the latex fed thereto, regardless of the variable pressure required for such expulsion.

2. That method of forming a uniform lengthy article from latex comprising forcing a constant volume of relatively incompressible liquid against one portion of a volume of liquid latex to expel a constant volume of latex from another portion thereof and forming a uniform thread from such expelled latex at a constant rate.

3. That method of forming a lengthy rubber article from heat-sensitive latex comprising placing the latex in a pressure chamber, continuously forcing an incompressible liquid into said chamber at a constant rate, which liquid is maintained separate from the latex, to expel the latex therefrom at the same rate, conducting the expelled latex into a forming mold, heating the mold to coagulate the latex to form a rubber article, and continuously forcing said article from said mold at a constant rate regardless of the pressure required for such expulsion by the continual volume of latex expelled from the pressure chamber by the feed of the incompressible liquid.

HAROLD W. GREENUP.